C. A. XARDELL.
PRIMARY BATTERY.
APPLICATION FILED MAR. 13, 1919.

1,338,412.

Patented Apr. 27, 1920.

Inventor;
Charles A. Xardell,
by
Attys.

UNITED STATES PATENT OFFICE.

CHARLES A. XARDELL, OF UTICA, NEW YORK.

PRIMARY BATTERY.

1,338,412.     Specification of Letters Patent.     Patented Apr. 27, 1920.

Application filed March 13, 1919. Serial No. 282,304.

*To all whom it may concern:*

Be it known that I, CHARLES A. XARDELL, a citizen of the United States, residing at Utica, in the county of Oneida and State of New York, have invented or discovered certain new and useful Improvements in Primary Batteries, of which the following is a specification, reference being had therein to the accompanying drawing.

This invention relates to a primary dry cell battery, and has for its object to provide a battery of this kind which will afford a current capacity of relatively high voltage for a given size of battery, as also a battery which is, for all practical purposes, non-polarizing.

Figure 1:
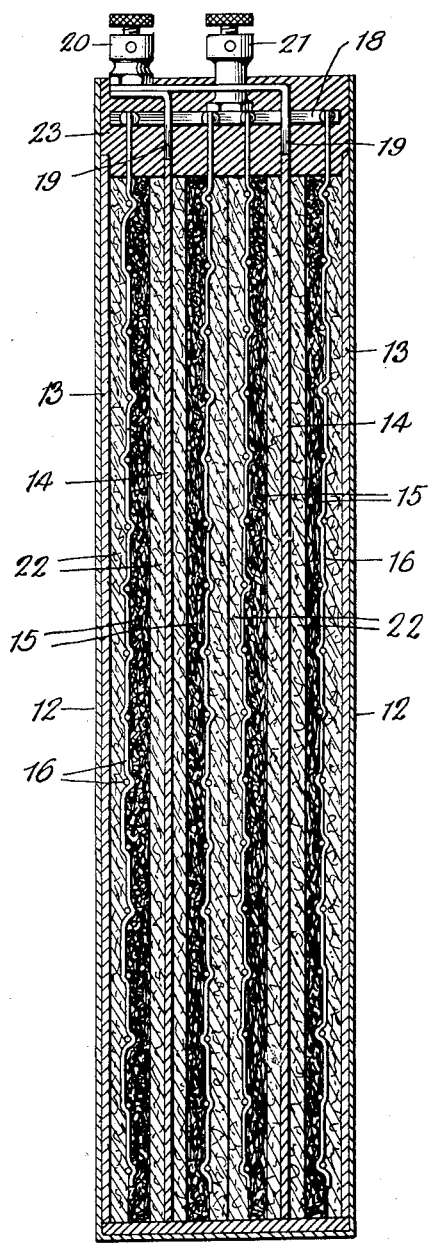
Figure 2:
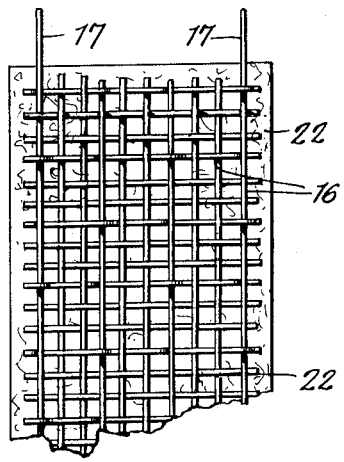

In the accompanying drawing Figure 1 is a vertical section of the improved battery, and Fig. 2 a detail view of a portion of one of the wire grids and the packing.

Referring to the drawing, 12 denotes a suitable vessel or container which will preferably consist of a light iron casing enameled with non-corroding or insulating material, said casing being lined with insulating material 13 which may be of paper, fiber, rubber or the like. The battery preferably comprises a plurality of positive and negative elements, one positive element being interposed between and insulated from each two negative elements. The positive elements will preferably consist of zinc plates 14 and the negative elements 15 will preferably consist of a paste of metallic oxid, such as peroxid of lead, manganese oxid, or other suitable depolarizing material, which will combine with the hydrogen given off from the zinc plates in operation and thus prevent polarization of the cell. This paste may also contain a small proportion of finely divided carbon and a suitable binder of gum or the like, and the paste will be moistened with the electrolyte which will be of any well known or suitable character. The paste constituting these negative elements, between each pair of which a positive element is interposed, is preferably supported by wire grids 16 having upwardly projecting bars 17 by which they are connected with a bus bar 18, said grids being partially embedded in the depolarizing paste of these negative elements.

The positive elements 14 are narrowed to form arms 19 at their tops, these arms being bent so as to be brought together and in contact with a binding post 20. A second binding post 21 is connected with or in contact with the bus bar 18 to which the negative elements of the battery are connected.

In contact with the walls of the cell and also interposed between the elements of the cell are packings 22 consisting preferably of sheets of porous paper in which the wire grids are partially embedded, these porous packings serving not only as absorbents for the electrolyte but also as insulating separators for the positive and negative elements. As clearly shown in Fig. 1 these absorbent porous packings of insulating material are disposed at both sides of and in contact with the positive and negative elements 14 and 15, as well as serving as linings for the vertical side walls of the cell.

The various elements constituting the battery, after being properly connected together and soldered, are placed in the vessel or container and the upper portion of the vessel providing the cell is then preferably filled with a hot insulating compound 23 which on cooling solidifies and thus firmly fastens the connections and at the same time seals the top of the cell and prevents evaporation of the electrolyte. This sealing insulating compound may be of any suitable material, such as shellac, pitch, or wax, or compounds of mixtures of the same.

In the construction shown in the accompanying drawing the battery comprises two positive elements and two pairs of negative elements between each pair of which a positive element is disposed. The battery may, however, consist of any desired numbers of these "couples" of positive and negative elements, according to the desired size or power of the battery.

As shown in Fig. 2, the wire grids 16 are preferably somewhat less in size than the porous packings 22 so as to leave margins of the latter around the grids.

Having thus described my invention I claim and desire to secure by Letters Patent:—

1. A primary dry cell battery consisting of a plurality of positive elements and a plurality of pairs of negative elements between each pair of which a positive element is disposed, combined with packings of absorbent insulating material at and in contact with each side of each of said positive and negative elements, a bus bar to which said negative elements are connected, connections between said positive elements, binding posts for said bus bar and said positive element connections, a vessel or container for the said battery elements and parts and an insulating compound by which the top of said vessel or container is sealed.

2. A primary dry cell battery consisting of a plurality of positive elements and a plurality of pairs of negative elements between each pair of which a positive element is disposed, combined with packings of absorbent insulating material at and in contact with each side of each of said positive and negative elements, said negative elements each consisting of a flat wire grid and a body of depolarizing paste which is of lesser width than said insulated packing, said grid being partly embedded in said paste and in said insulating packing material.

3. A primary dry cell battery consisting of a plurality of positive elements and a plurality of pairs of negative elements between each pair of which a positive element is disposed, combined with packings of absorbent insulating material at and in contact with each side of each of said positive and negative elements, a bus bar to which said negative elements are connected, connections between said positive elements, and binding posts for said bus bar and said positive element connections, said negative elements each consisting of a flat wire grid and a body of depolarizing paste which is of lesser width than said insulated packing, said grid being partly embedded in said paste and in said insulating packing material.

4. A primary dry cell battery consisting of a plurality of positive elements and a plurality of pairs of negative elements between each pair of which a positive element is disposed, combined with packings of absorbent insulating material at each side of each of said positive and negative elements, a bus bar to which said negative elements are connected, connections between said positive elements, binding posts for said bus bar and said positive element connections, a vessel or container for the said battery elements and parts and an insulating compound by which the top of said vessel or container is sealed, said negative elements each consisting of a flat wire grid and a body of depolarizing paste which is of lesser width than said insulated packing, said grid being partly embedded in said paste and in said insulating packing material.

In testimony whereof I affix my signature.

CHARLES A. XARDELL.